Patented June 2, 1942

2,285,337

UNITED STATES PATENT OFFICE 2,285,337

PROCESS OF PRODUCING SULPHONATED PRODUCTS

Roland Kapp and Leo J. Mosch, Newark, and Everett T. Woods, Arlington, N. J., assignors to National Oil Products Company, Harrison, N. J., a corporation of New Jersey No Drawing. Application March 24, 1938, Serial No. 197,858

9 Claims. (Cl. 260—400)

The invention relates, in general, to the production of sulphonated fatty materials and, in particular, to the production of substantially anhydrous and salt-free sulphonated materials selected from the group consisting of animal and vegetable oils, fats and their respective acids.

Sulphonated materials of the type mentioned, as now produced, contain relatively large amounts of inorganic salts and water. The usual method of sulphonating fatty materials comprises treating the material with a sulphonating agent, such as sulphuric acid, chlorsulphonic acid, oleum, or other suitable agent and when the reaction has proceeded to the desired stage, the sulphonation mass is washed with an aqueous salt solution to eliminate most of the residual sulphonating agent. This washing, however, cannot be carried out to a point where all excess sulphonating agent is eliminated, because of the emulsifying properties of the sulphonated mass and because such washing, if excessive, considerably reduces the yield of sulphonated material. Moreover, the washing operation also causes the formation of undesirable by-products, by hydrolysis of the sulphonation mass, and must, therefore, be limited to the point where it still gives a good yield of sulphonated material not containing too high a proportion of these hydrolytic by-products. For these and other reasons, the remainder of the excess sulphonating acid is not eliminated by water washes, but is neutralized instead with aqueous alkaline solutions. The aqueous solutions of the inorganic salts formed by this neutralization are then partially settled out of the sulphonated mass by allowing the same to stand and separate into layers. During the neutralization process, enough alkali is used so that part or all of the combined acid of the sulphonated oil is also neutralized. The extent of this neutralization of the sulphonated oil itself depends on the intended use of the oil, the pH of which can be varied to suit such use.

As pointed out above, the emulsifying properties of the sulphonated mass, and the water solubility imparted to it by sulphonation, make for the retention in the sulphonated oil of substantial proportions of both water and inorganic salts, even after prolonged washing and standing. The sulphonated oils now produced are therefore relatively high in both water and inorganic salt content, the water content being about 10% to 30% and the inorganic salt content being generally 1% or higher. The retention of the salts in the sulphonated oil is, of course, aided by the presence of water in which they are soluble, and the salts thus retained are due both to neutralization of the excess acid used for sulphonation and to the washing of the crude sulphonation mass with aqueous salt solution.

The relatively high water and salt content of the prior sulphonated fatty acids, fatty oils and fatty derivatives is undesirable and detrimental for various reasons. The high water content of commercial products greatly reduces their range of application and adds to the difficulty of their mixing with non-sulphonated oils or other substances with which they are incorporated for industrial uses.

The inorganic salt content reduces the stability of emulsions produced with the sulphonated oils, and is often detrimental to the materials treated with these oils. By catalytic action, the salts also cause the oils to hydrolyze and to oxidize more rapidly and thereby considerably reduce their usefulness in various processes where these oils are employed, since it is generally necessary that the oils used in such materials as textiles, paper, leather, etc. for lubricating or of finishing operations should show a minimum of oxidizability. The inorganic salts also considerably reduce the miscibility of sulphonated oils with other oils such as mineral oil and fatty oils.

Methods designed to eliminate the above and other drawbacks due to the presence of water, inorganic salts and hydrolytic by-products in sulphonated fatty materials, and to prepare these materials in such a manner that these elements are either eliminated or present in such small proportion that they have none of the heretofore observed detrimental effects, are disclosed and claimed in copending applications Serial No. 77,761, filed May 4, 1936; and Serial No. 160,270, filed August 21, 1937. These methods generally comprise dispersing the crude sulphonation mass in a substantially anhydrous solvent, before any washing with water, and then neutralizing the excess sulphonating agent with alkalies, such as potash, soda, ammonia, etc. in the presence of the solvent and separating the inorganic salts of neutralization which precipitate out. The volume of the solvent used must be at least equal to or preferably 2 to 4 times the volume of the sulphonation mass. The salts may be removed from the mass by filtration, centrifuging, decanting or otherwise. The alkali used in neutralizing the excess acid may be added as a highly concentrated water solution, or it may be dissolved in any suitable organic solvent, preferably in the same solvent used in taking up the sulphonation mass or at least one miscible therewith. After separation of the inorganic salts, the substantially salt-free solvent solution of the sulphonated material is distilled, preferably under vacuum, to drive off the solvent and any incidental water that was present, as well as that which was formed during the neutralization process. The resulting sulphonated material is substantially free from water and inorganic salts.

While the foregoing process and the products produced thereby have enjoyed commercial success, it has now been discovered that substantially anhydrous and salt-free sulphonated fatty materials may be produced more efficiently.

The general object of the invention is to provide an improved process of producing substantially anhydrous and salt-free sulphonated fatty materials.

A specific object of the invention is to provide a more efficient process of producing substantially anhydrous and salt-free sulphonated fatty materials than heretofore known.

Other objects of the invention will in part be obvious and will in part appear hereinafter.

According to the invention the process comprises subjecting a sulphonated material, selected from the group consisting of animal and vegetable oils, fats and their respective acids, which have been processed according to the usual process of washing, neutralizing, panning, etc., to dehydration under a relatively low temperature and at reduced pressure. The partially dehydrated product is then taken up in a substantially anhydrous organic solvent, whereby the inorganic salts are precipitated out and removed from the sulphonated material by filtration, decantation, centrifuging or the like. The salt-free material is then subjected to distillation under reduced pressure to remove the solvent and substantially all the remaining water. The original sulphonated material which usually contains from about 10% to 30% water is preferably dehydrated to water content of about 0.5% to 5.0% before being taken up in the solvent.

The invention accordingly comprises the several steps and the relation of one or more of such steps with respect to each of the others thereof, which will be exemplified in the process hereinafter disclosed, and the scope of the invention will be indicated in the claims.

As aforementioned, the process of the invention is particularly concerned with the treatment of a finished sulphonated fatty material which has been produced according to the heretofore known or general practices. In other words, the starting material for the purpose of this invention is a sulphonated fatty material which has been subjected to the usual washing and neutralizing steps and which may contain varying quantities of water and inorganic salts, the usual water content being about 10% to 30% and the inorganic salt content being about 1% or more. The expression "ordinary finished sulphonated fatty material" or "a sulphonated material in its ordinary finished state" will be used herein to connote a washed and neutralized sulphonated fatty material containing about 10% or more water and about 1% or more inorganic salts.

The first step of the process of the invention comprises dehydrating an ordinary finished sulphonated fatty material selected from the group consisting of animal and vegetable oils, fats and their respective acids by subjecting the same to heat under reduced pressure. This step may be accomplished by any suitable means, such, for example, as by applying or spreading a relatively thin film of the material on a heated rotating roller or in stationary trays, disposed within a chamber maintained under reduced pressure, or by use of an ordinary reduced pressure still or by any other suitable means whereby the water may be separated in a similar manner without deleteriously affecting the sulphonated material. The sulphonated material is subjected to this dehydrating operation until the water content is reduced to about 5% or less.

The second step of the process of the invention is to take up the dehydrated material in an organic solvent for the sulphonated material, the amount of solvent being at least equal to or preferably 2 to 4 times or more of the volume of sulphonated material. During the operation of dissolving the sulphonated material in a suitable solvent, substantially all the inorganic salts present are precipitated out. The material should be thoroughly admixed with the solvent as by stirring or by other means of agitation.

The third step of the process of the invention comprises removing the precipitated salts from the solution as by filtration, decantation, centrifuging, etc., filtration being preferred.

The fourth step of the process of the invention comprises removing the solvent and substantially all the residual water from the substantially salt-free product. This step is preferably carried out i a reduced pressure still wherein the solvent and water will be driven off at a relatively low temperature.

The foregoing process is adapted for the treatment of a wide variety of sulphonation products of animal and vegetable fats, oils and fatty acids, a few of which may be enumerated as follows: vegetable oils, such as castor, corn, cottonseed, olive, palm, peanut, sunflower, rice bran, rapeseed, teaseed, chaulmoogra, tomato seed, sesame, soya bean, cocoa butter, Chinese tallow, etc.; animal oils: neat's-foot, beef tallow, bone fat, horse fat, wool fat, mutton tallow, etc.; marine oils: cod liver, cod, herring, menhaden, porpoise, seal, salmon, sardine, shark, sperm, whale, tuna, etc., as well as the corresponding acids of these oils. For the sake of brevity the marine oils will be considered, for purposes of this application, as included in the broad expression, "animal and vegetable" oil, fats, etc. It is also within the purview of the invention to include the treatment of sulphonation products of derivatives of the above materials, such as degraded glycerides of higher fatty acids, blown or hydroxylated derivatives, esters of fatty acids with hydroxy compound other than glycerol, etc.

The solvents which may be employed in carrying out the process include alcohols, hydrocarbons, chlorinated hydrocarbons, ethers and ketones or other suitable solvents which will dissolve a sulphonated fatty material and cause precipitation of inorganic salts therefrom. A few of the specific solvents that may be used are given as follows: ethyl alcohol, isopropyl alcohol, ethylene dichloride, petroleum ether, acetone, methyl ethyl ketone and methyl propyl ketone.

For a fuller understanding of the nature and objects of the invention, reference should be had to the following examples which are given merely to further illustrate the invention and are not to be construed in a limiting sense:

*Example I*

A 100 pound batch of ordinary finished sulphonated olive oil containing 22% water was applied in a thin film on a hollow roller of 12 inch diameter, revolving at 4 R. P. M., while passing ½# pressure steam through the roller. The roller was mounted within a sealed chamber which was maintained under a positive pressure of 12 to 15 mm. About 81 pounds of dehydrated oil was obtained which was found to have a moisture content of about 4%. This oil was then taken up in 340 pounds of isopropyl alcohol, agitated and permitted to stand for 24 hours, after which it was filtered to remove the precipitated inorganic salts. The filtered oil was then subjected to distillation under reduced pressure to remove the solvent and residual water. About 77 pounds of substantially anhydrous and salt-free sulphonated olive oil resulted from this process.

*Example II*

The same process as set forth under Example I with the exception that the heat of the roller was increased by using 3 to 5 pound pressure steam in lieu of ½ pound. The oil thus dehydrated had a moisture content of ½%. This product was then taken up in solvent and treated further in the same manner as illustrated in Example I.

It will be noted that the temperature of the roller in Examples I and II is relatively high, but no decomposition of the sulphonated oil took place due to the relatively short time in which the oil was actually in contact with the roller.

*Example III*

A 1200 pound batch of ordinary finished sulphonated olive oil was introduced into a vacuum still and heated from 43° C. to 60° C. at a positive pressure of from 70 to 80 mm. for a period of one hour. About 940 pounds of oil containing approximately ½% moisture was recovered and taken up in 2800 pounds of isopropyl alcohol. This batch was then finished according to the process under Example I.

In view of the fact that the sulphonated material is first neutralized and dehydrated to an appreciable degree, the solvent used does not become contaminated with large quantities of moisture and other impurities, thus materially decreasing solvent recovery and rectifying costs. While the specific examples given illustrate the treatment of sulphonated olive oil, per se, the same process is applicable to the treatment of sulphonation products of any of the fatty materials hereinbefore disclosed. In certain instances where the presence of inorganic salts is not objectionable, the step of taking up the sulphonated product in solvent may be omitted.

Since certain changes may be made in carrying out the above process without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described our invention, what we claim as new and desire to secure by Letters Patent is:

1. In a process of producing a substantially anhydrous and salt-free sulphonated material selected from the class consisting of animal and vegetable oils, fats and their respective acids, the steps which comprise partially dehydrating such a material, in its ordinary finished state, by subjecting the same to heat under reduced pressure, dispersing the partially dehydrated material in at least an equal volume of a substantially anhydrous organic solvent for said sulphonated material, separating the precipitated inorganic salts and removing the solvent and residual water by distillation.

2. In a process of producing a substantially anhydrous and salt-free sulphonated material selected from the class consisting of animal and vegetable oils, fats and their respective acids, the steps which comprise partially dehydrating such a material, in its ordinary finished state, by subjecting the same to heat under reduced pressure, dispersing the partially dehydrated material in at least an equal volume of a substantially anhydrous alcohol, separating the precipitated inorganic salts and removing the alcohol and residual water by distillation.

3. In a process of producing a substantially anhydrous and salt-free sulphonated material selected from the class consisting of animal and vegetable oils, fats and their respective acids, the steps which comprise partially dehydrating such a material, in its ordinary finished state, by subjecting the same to heat under reduced pressure, dispersing the partially dehydrated material in at least an equal volume of a substantially anhydrous ketone, separating the precipitated inorganic salts and removing the ketone and residual water by distillation.

4. In a process of producing a substantially anhydrous and salt-free sulphonated material selected from the class consisting of animal and vegetable oils, fats and their respective acids, the steps which comprise partially dehydrating such a material, in its ordinary finished state, by subjecting the same to heat under reduced pressure, dispersing the partially dehydrated material in at least an equal volume of a substantially anhydrous isopropyl alcohol, separating the precipitated inorganic salts and removing the alcohol and residual water by distillation.

5. In a process of producing a substantially anhydrous and salt-free sulphonated material selected from the class consisting of animal and vegetable oils, fats and their respective acids, the steps which comprise partially dehydrating such a material, in its ordinary finished state, by subjecting the same to heat under reduced pressure, dispersing the partially dehydrated material in at least an equal volume of a substantially anhydrous ethylene dichloride, separating the precipitated inorganic salts and removing the ethylene dichloride and residual water by distillation.

6. In a process of producing a substantially anhydrous and salt-free sulphonated material selected from the class consisting of animal and vegetable oils, fats and their respective acids, the steps which comprise partially dehydrating such a material, in its ordinary finished state, containing about 10% to 30% of water, by subjecting the same to heat under reduced pressure until the water content has been reduced to ½% to 5%, dispersing the partially dehydrated material in at least an equal volume of a substantially anhydrous organic solvent for said sulphonated material, separating the precipitated inorganic salts and removing the solvent and residual water by distillation.

7 In a process of producing a substantially anhydrous and salt-free sulphonated material selected from the class consisting of animal and vegetable oils, fats and their respective acids, the steps which comprise partially dehydrating such a material, in its ordinary finished state, containing about 10% to 30% of water, by subjecting the same to heat under reduced pressure until the water content has been reduced to ½% to 5%, dispersing the partially dehydrated material in at least an equal volume of a substantially anhydrous isopropyl alcohol, separating the precipitated inorganic salts and removing the alcohol and residual water by distillation.

8. In a process of producing a substantially anhydrous and salt-free sulphonated material selected from the class consisting of animal and vegetable oils, fats and their respective acids, the steps which comprise partially dehydrating such a material, in its ordinary finished state, containing about 10% to 30% of water, by subjecting the same to heat under reduced pressure until the water content has been reduced to ½% to 5%, dispersing the partially dehydrated material in at least an equal volume of a substantially anhydrous ethylene dichloride, separating the precipitated inorganic salts and removing the ethylene dichloride and residual water by distillation.

9. In a process of producing a substantially anhydrous and salt-free sulphonated material selected from the class consisting of animal and vegetable oils, fats and their respective acids, the steps which comprise partially dehydrating such a material, in its ordinary finished state, by subjecting the same to heat under reduced pressure, dispersing the partially dehydrated material in at least an equal volume of a substantially anhydrous halogenated hydrocarbon solvent, separating the precipitated inorganic salts and removing the solvent and residual water by distillation.

ROLAND KAPP.
LEO J. MOSCH.
EVERETT T. WOODS.